(12) United States Patent
Cracraft et al.

(10) Patent No.: US 10,091,943 B2
(45) Date of Patent: Oct. 9, 2018

(54) ROUND MODULE WEIGHING USING DIFFERENTIAL PRESSURE SENSING

(71) Applicants: Deere & Company, Moline, IL (US);
Iowa State University Research Foundation, Ames, IA (US)

(72) Inventors: Mark A. Cracraft, Johnston, IA (US);
Jesse D. Haecker, Leclaire, IA (US);
Thomas M. Alferink, Jesup, IA (US);
Jeffrey C. Askey, Boone, IA (US);
Matthew J. Darr, Ames, IA (US)

(73) Assignees: Deere & Company, Moline, IL (US);
Iowa State University Research Foundation, Inc., Ames, IA (US)

( * ) Notice: Subject to any disclaimer, the term of this patent is extended or adjusted under 35 U.S.C. 154(b) by 116 days.

(21) Appl. No.: 15/256,844

(22) Filed: Sep. 6, 2016

(65) Prior Publication Data
US 2018/0064032 A1 Mar. 8, 2018

(51) Int. Cl.
*A01F 15/08* (2006.01)
*G01G 19/08* (2006.01)
*A01F 15/07* (2006.01)
*A01D 46/08* (2006.01)

(52) U.S. Cl.
CPC ........ *A01F 15/0883* (2013.01); *A01D 46/085* (2013.01); *A01F 15/07* (2013.01); *G01G 19/08* (2013.01); *A01F 2015/0891* (2013.01)

(58) Field of Classification Search
CPC .................. A01F 15/0883; A01F 15/07; A01F 2015/0891; G01G 19/08; A01D 46/085
See application file for complete search history.

(56) References Cited

U.S. PATENT DOCUMENTS

| 4,362,097 | A | 12/1982 | Rogers |
| 4,491,190 | A | 1/1985 | Mayfield |
| 4,742,880 | A * | 5/1988 | Schrag ................ A01F 15/0875 177/136 |
| 6,457,295 | B1 | 10/2002 | Arnold |
| 7,091,425 | B2 | 8/2006 | Viaud et al. |
| 7,146,294 | B1 * | 12/2006 | Waitkus, Jr. .......... B30B 9/3007 702/188 |
| 7,805,914 | B2 | 10/2010 | Smith |
| 7,987,776 | B1 * | 8/2011 | Lanning .................. B30B 9/301 100/218 |
| 2006/0246966 | A1 * | 11/2006 | Smith ................ A01D 41/1276 460/112 |

(Continued)

FOREIGN PATENT DOCUMENTS

WO   WO-2016058890 A1 *  4/2016  ........... A01F 12/448

OTHER PUBLICATIONS

Yield Monitor for Round and Square Hay Balers CURF Ref No. 2015-052, 1 page.

(Continued)

*Primary Examiner* — Rodney A Butler
(74) *Attorney, Agent, or Firm* — Joseph R. Kelly; Kelly, Holt & Christenson PLLC

(57) ABSTRACT

A harvester generates a round module and positions the round module on a handler. The handler includes a cylinder having a base end and a rod end. A differential pressure across the cylinder is detected. A round module weight is generated based on the detected differential pressure.

20 Claims, 11 Drawing Sheets

(56) References Cited

U.S. PATENT DOCUMENTS

| | | | | |
|---|---|---|---|---|
| 2006/0278103 | A1* | 12/2006 | Derscheid | A01F 15/0833 100/88 |
| 2009/0107349 | A1* | 4/2009 | Noonan | A01F 15/071 100/14 |
| 2009/0223196 | A1* | 9/2009 | Smith | A01F 15/0883 56/341 |
| 2011/0086684 | A1* | 4/2011 | Luellen | G01N 1/04 460/79 |
| 2014/0335923 | A1* | 11/2014 | Biggerstaff | A01F 7/04 460/75 |
| 2016/0084813 | A1* | 3/2016 | Anderson | A01D 41/127 702/5 |
| 2016/0165803 | A1* | 6/2016 | Smith | A01F 15/0833 700/275 |
| 2016/0187185 | A1* | 6/2016 | Smith | A01F 15/0833 177/1 |

OTHER PUBLICATIONS

Crop Yield Monitor for Round and Square Hay Balers (2015-052) CURF Ref No. 2015-052, Published Jun. 15, 2016. 3 pages, http://curf.technologypublisher.com/files/sites/kirk,-2015-052,-ncs.pdf.

* cited by examiner

ROUND MODULE WEIGHING USING DIFFERENTIAL PRESSURE SENSING

FIELD OF THE DESCRIPTION

The present description relates to detecting physical characteristics of an agricultural item. More specifically, the present description relates to weighing a round module of agricultural material, such as cotton.

BACKGROUND

There are many different types of agricultural machines. Some machines bale agricultural material, such as cotton. Cotton balers (or harvesters) often have a baling and wrapping mechanism that bales and wraps cotton, generating round modules. The round modules are expelled from the baling and wrapping mechanism onto a handler. The handler can carry the bales to an end portion of the field being harvested where they can be positioned for later pickup and transport by a hauling vehicle. The hauling vehicle may haul the round modules to a storage facility, to a cotton gin, or other processing facility.

The weight of a round module may be beneficial, as it may be indicative of a variety of different things. It may be indicative of the amount of cotton harvested and contained in the module. It may be indicative of the moisture level of the cotton in the module, and it may be indicative of other things.

It can be difficult to obtain an accurate weight value for a given round module. This can be for a variety of different reasons. For instance, once a cotton module is generated and wrapped, it is moved to, and carried by, the handler so that another cotton module can be generated. When the module is sitting on the handler, the cotton harvester is often still moving. It is not until the harvester reaches the end of the field that the round module will be removed from the handler. Generating a weight value, while the cotton harvester is moving, can be difficult.

The discussion above is merely provided for general background information and is not intended to be used as an aid in determining the scope of the claimed subject matter.

SUMMARY

A harvester generates a round module and positions the round module on a handler. The handler includes a cylinder having a base end and a rod end. A differential pressure across the cylinder is detected. A round module weight is generated based on the detected differential pressure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
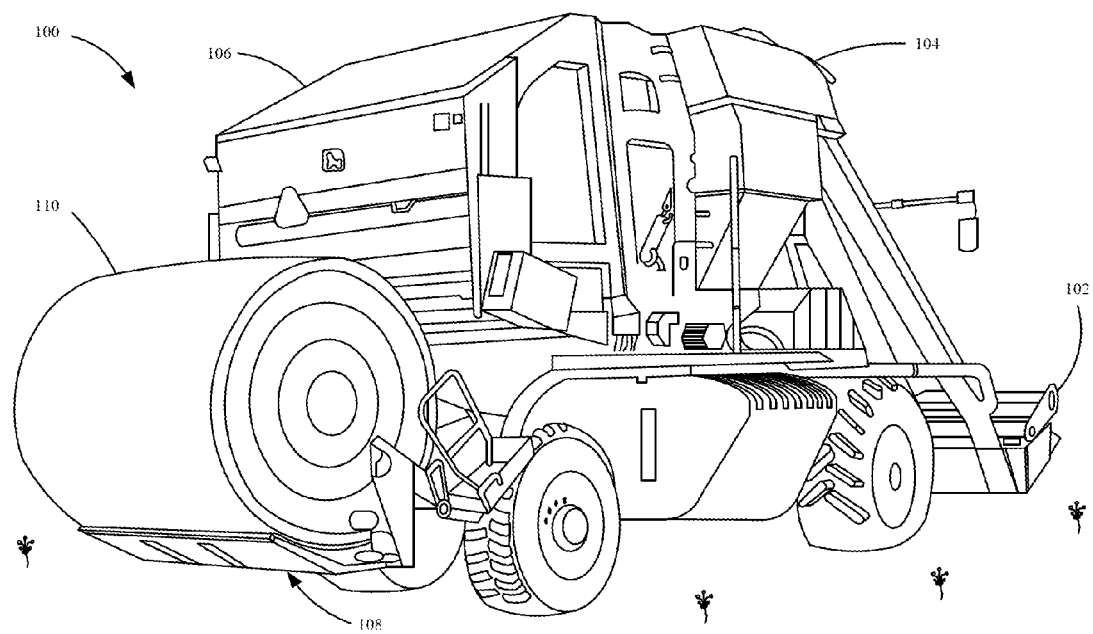
FIG. 1 is a pictorial view of a one example of an agricultural baling machine, such as a cotton harvester.

FIG. 1 is a pictorial illustration of one example of an agricultural mobile machine 100. Mobile machine 100, in the example shown in FIG. 1, is a cotton harvester. Cotton harvester 100 illustratively includes a header portion 102, an operator compartment 104, a baling/wrapping system 106 and a handler 108. Header 102 illustratively engages the crop being harvested and feeds it back to baling/wrapping system 106. System 106 illustratively generates a round module, such as module 110 illustrated in FIG. 1. When the module 110 is wrapped, it is transferred onto handler 108, which is in a module receiving position. Movement of handler 108 is illustratively driven or controlled by one or more actuators (such as hydraulic cylinders), which then lower handler 108 into a module transport position, such as that shown in FIG. 1. Module 110 can then be transported on handler 108 until harvester 100 reaches a desired unload position, such as at the end of the field being harvested, where module 110 can be unloaded from handler 108. Module 110 can then be picked up later and hauled to a remote facility, such as a storage facility, a cotton gin, or another processing facility.

In one example, machine 100 includes a variety of different sensors. For instance, the sensors can sense the location and orientation of machine 100. By way of example, a GPS receiver (or other geographic position sensor) can sense the geographic location of machine 100. Other sensors can sense the pitch and roll attitudes of machine 100 as well. The sensors can sense the heading, machine speed, and a variety of other characteristics of machine 100, some of which are described in greater detail below.

In addition, as shown in FIG. 1, handler 108 is illustratively movable about a pivot axis relative to the frame of machine 100. Thus, handler 108 can be pivoted upward into the module receiving position where it receives the module after it is removed from baling and wrapping system 106. It can then be lowered to the transport position, such as the position shown in FIG. 1, where module 110 is transported to a desired drop off location.

Figure 2:
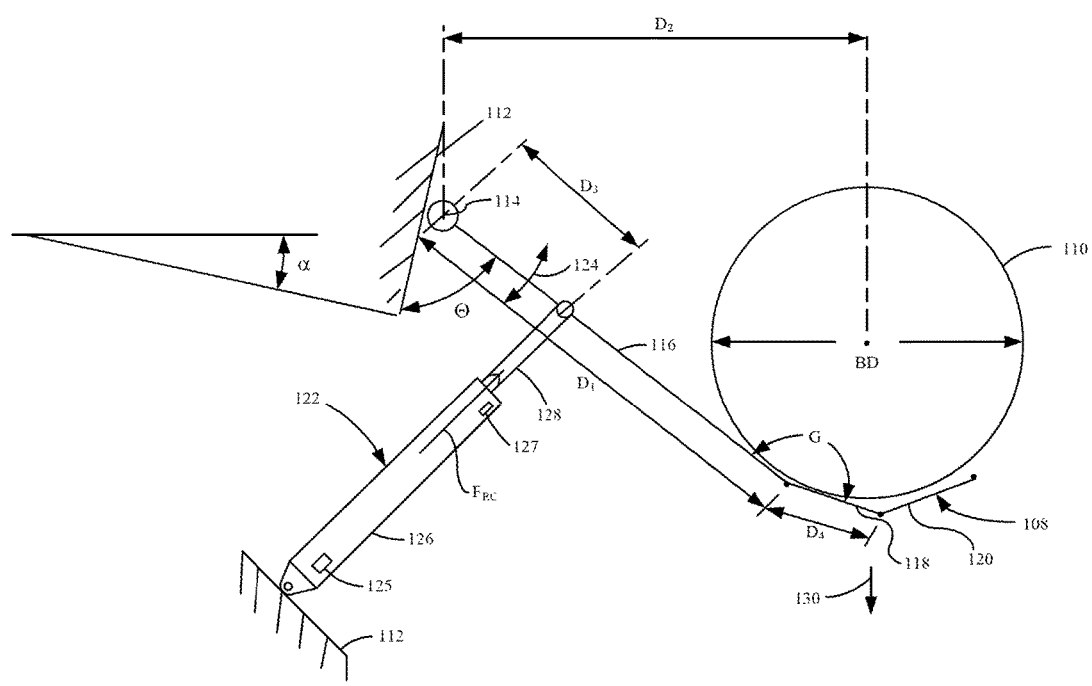
FIG. 2 is a partial schematic, partial pictorial view illustrating portions of the cotton harvester shown in FIG. 1.

FIG. 2 is a partial pictorial, partial schematic view of a portion of harvester 100, shown in FIG. 1. FIG. 2 shows that handler 108 is illustratively pivotally coupled to a frame 112 of machine 100 about pivot axis 114. Handler 108 illustratively includes a first portion 116, a second portion 118 (which is disposed at an angle gamma (G) relative to the first portion 118), and a third portion 120 that is also disposed at an angle relative to portion 118. The intersection of portions 118 and 120 define a carrying location where round module 110 rests, when handler 108 is in the transport position. FIG. 2 also shows that, in one example, at least one hydraulic cylinder (or other actuator) 122 is coupled for movement between a portion of frame 112 of machine 100 and first portion 116 of handler 108 to drive pivotal movement of handle 108 in the direction generally indicated by arrow 124 about pivot axis 114. Cylinder 122 illustratively includes a base portion 126 and rod portion 128. Hydraulic fluid under pressure is introduced into the base portion 126 of cylinder 122 to drive extension of rod 128 to pivot handler 108 in the upward direction. Hydraulic fluid under pressure can be removed from the base portion 126 to allow rod 128 to retract within cylinder 122, or it can be introduced into the rod portion to drive retraction of rod 128 within cylinder 122, so that handler 108 can be lowered about pivot axis 114.

Cylinder 122 also has sensors that sense the differential pressure across the cylinder. For instance, base sensor 125 senses the hydraulic pressure at the base end of cylinder 122 and generates a signal indicative of that pressure, and rod pressure sensor 127 senses hydraulic pressure at the rod end of cylinder 122 and generates a signal indicative of that pressure. The pressures indicated by the two signals can then be combined (such as subtracted from one another) to obtain the differential pressure.

Also, in the example shown in FIG. 2, the pitch angle alpha can be sensed by a sensor on machine 110 and identifies the pitch orientation of machine 100 relative to horizontal. The angle theta is also illustratively detected by a sensor on machine 100 and identifies the angle at which the first portion 116 of handler 108 is pivotally disposed relative to frame 112. In FIG. 2, the length of first portion 116 of handler 108 is indicated by $D_1$. The perpendicular distance between the pivot axis 114 and the center of gravity of round module 110 is indicated by $D_2$. The distance between the pivot axis 114 and the point at which cylinder 122 exerts force on handler 108 is indicated by $D_3$ and the length of the second portion 118 of handler 108 is indicated by $D_4$. FIG. 2 shows that the resultant cylinder force $F_{RC}$ is the force exerted by cylinder 122 to maintain handler 108 in a given position, such as in the travel position shown in FIGS. 1 and 2. This force can be used to determine the weight of module 110.

In one example, the bale diameter BD of round module 110 is relatively constant through various portions of the field being harvested. However, at other portions (such as end rows or other portions of the field) the bale diameter BD can vary widely. When the bale diameter is relatively small, for instance, this can affect the dynamics of the forces acting on the system shown in FIG. 2. For instance, if BD is relatively small, and the pitch angle alpha is relatively large (such as when machine 100 is going uphill), then round module 110 will roll slightly to the right (with reference to the system shown in FIG. 2) when carried by handler 108 in the transport position. If the pitch angle alpha is negative (such as when machine 100 is going downhill), and BD is small, then round module 110 may roll slightly to the left as shown in FIG. 2. Because of this, and as is described in greater detail below, the bale diameter BD is taken into account in determining the bale weight of round module 110.

By detecting the various angles and differential pressure in cylinder 122, and by knowing the various length measurements and bale diameter, the resultant force $F_{RC}$ on cylinder 122 can be identified. From this, the weight indicated generally as a downward force identified by arrow 130 in FIG. 2 can be determined. Also, various filtering, averaging and other techniques can be employed in order to compensate for accelerations exerted on round module 110 due to the travel of machine 100 (e.g., through the field being harvested). This is all described in greater detail below.

Figure 3:
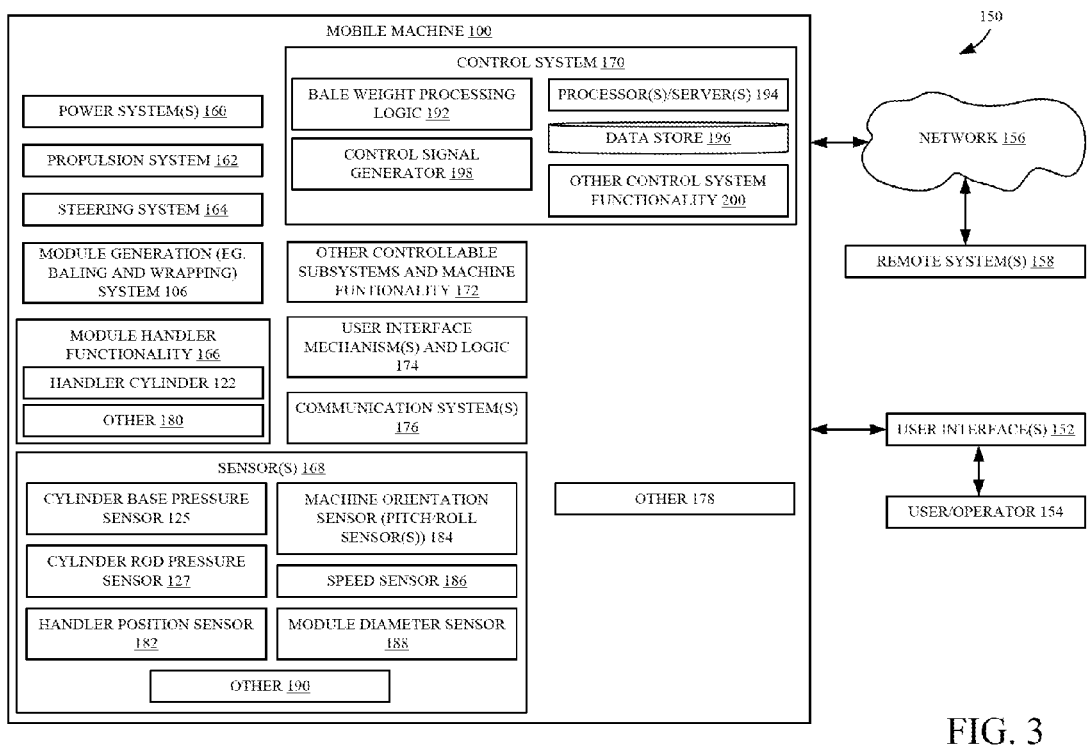
FIG. 3 is a block diagram of one example of a mobile machine (such as a cotton harvester), in a mobile machine architecture.

FIG. 3 is a block diagram of one example of a mobile machine architecture 150. Architecture 150 illustratively shows machine 100 generating one or more user interfaces 152 which a user or operator 154 can interact with in order to control and manipulate mobile machine 100. Architecture 150 also shows an example in which mobile machine 100 can communicate with one or more other remote systems 158 over network 156. Network 156 can be a wide area network, a local area network, a cellular network, a near field communication network, a store-and-forward network, or a wide variety of other networks. In the example shown in FIG. 3, mobile machine 100 is a cotton harvester, and it can include one or more power systems 160, propulsion system 162, steering system 164 and module generation (e.g., baling and wrapping) system 106, and well as module handler functionality 166. Machine 100 can also include one or more sensors 168, control system 170, one or more controllable subsystems and other machine functionality 172, user interface mechanisms and logic 174, communication systems 176, and it can include other items 178. A brief description of some of the items in mobile machine architecture 150 will be provided, before describing its operation in weighing module 110 in more detail.

Power systems 160 can, for instance, include an engine that may power other systems on machine 100, such as propulsion system 162, mechanical actuators, an electrical system, a hydraulic system, an air-over-hydraulic system, or other systems. Propulsion system 162 illustratively provides power to a transmission that drives the propulsion of machine 100. This can be done through wheels, tracks, etc. Steering system 164 illustratively allows operator 154 to interact with one or more user interface mechanisms 174 or other user interfaces 152 in order to steer machine 100 and to control its speed. Thus, the user interface mechanisms and logic 174 can include a steering wheel, a joystick, levers, foot pedals, switches, or a wide variety of other user interface mechanisms.

As discussed above, as machine 100 travels through a field, module generation system 106 illustratively bales and wraps a module of agricultural material being harvested, such as cotton. Module handler functionality 166 can include the cylinder 122, the other items shown in FIG. 2, as well as other functionality 180. Module handler functionality 166 illustratively receives module 110 from module generation system 106 and can carry it in the transport position (such as that shown in FIGS. 1 and 2) until it is in a desired drop off location. Module handler functionality 166 can then control handler 108 to drop module 110 at that location.

Sensors 168 can include a wide variety of different sensors, such as base pressure sensor 125, rod pressure sensor 127, handler position sensor 182 that senses the angle theta (shown in FIG. 2), machine orientation sensor 184 (that can sense the angle alpha shown in FIG. 2 as well as the roll angle of machine 100, its geographic position or location, among other things). Sensors 168 can also include a speed sensor 186 that senses a speed of machine 100, module diameter sensor 188 that senses the bale diameter BD (shown in FIG. 2) of module 110 and other modules generated by system 106, and it can include other sensors 190.

The sensors 168 can illustratively generate sensor signals indicative of the sensed variables that they each sense, and provide that signal to control system 170, or to other items on machine 100. Control system 170 can then generate control signals that can be used to control controllable subsystems 172, handler functionality 166, module generation system 106, propulsion and steering systems 162 and 164, among a wide variety of other things. Communication system 176 can send values indicated by the sensor signals, or other information, to remote systems 158, to user interfaces 152 for presentation to operator 154, or to other places.

Control system 170, itself, illustratively includes bale weight processing logic 192, one or more processors or servers 194, data store 196, control signal generator 198, and it can include a wide variety of other control system functionality 200. Bale weight processing logic 192 illustratively receives various sensor signals and generates a value indicative of the weight of the bale or module 110 being carried by handler 108. A more detailed discussion of bale weight processing logic 192 is provided below with respect to FIG. 4. Control signal generator 192 can generate one or more control signals based upon the bale weight determined by logic 192, or based upon other items. The bale weight or other items can be stored in data store 196 or provided to remote systems 158, to operator 154, or output in other ways for further processing.

Figure 4:
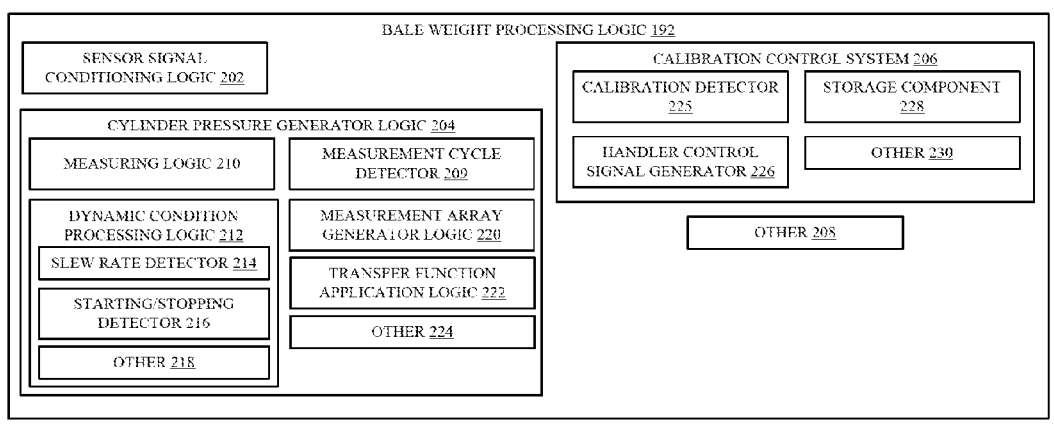
FIG. 4 is a block diagram showing one example of bale weight processing logic, in more detail.

FIG. 4 is a more detailed block diagram of one example of bale weight processing logic 192. Logic 192 can include sensor signal conditioning logic 202, cylinder pressure generator logic 204, calibration control system 206, and it can include other items 208. Cylinder pressure generator logic 204, itself, can include measurement cycle detector 209, measuring logic 210, dynamic condition processing logic 212 (which can include slew rate detector 214, starting/stopping detector 216 and other items 218), measurement array generator logic 220, transfer function application logic 222, and it can include other items 224. Calibration control system 206, itself, can include handler control signal generator 226, storage component 228, and it can include other items 230. Before describing the operation of bale weight processing logic 192 in more detail, a brief overview of some of the items in logic 192, and their operation, will first be provided.

Sensor signal conditioning logic 202 illustratively receives sensor signals from various sensors 168 and performs conditioning operations on those signals. For instance, logic 202 can perform filtering, amplification, linearization, normalization, or a wide variety of other signal conditioning operations.

Cylinder pressure generator logic 204 illustratively generates values indicative of the cylinder pressures sensed in cylinder 122, and also determines whether dynamic conditions exist which would make those pressures less accurate in determining a weight of module 110. Measuring logic 210 illustratively receives the sensor signals from base pressure sensor 125 and rod pressure sensor 127, as well as from handler position sensor 182, machine orientation sensor 184, speed sensor 186, and diameter sensor 188, and can determine whether the dynamic conditions exist, at which point it can restart or reset the measurement operation that is being used to measure, or estimate, the weight of module 110.

Slew rate detector 214, for instance, detects a slew rate (or rate of change) of the detected differential pressure (which may be the pressure difference sensed by sensors 125 and 127 on cylinder 122). If it is changing rapidly, this may indicate a relatively extreme vehicle acceleration, such as when machine 100 has encountered a large bump, or other terrain or condition that exerts a relatively high acceleration on it. Starting/stopping detector 216 can receive the speed sensor signal from speed sensor 186 to determine whether the machine has recently stopped (or is stopping) or whether the machine has recently started moving. That is, detector 216 can detect when the vehicle is transitioning from movement to a stop condition (or zero speed condition) or from a stop condition to a movement condition. When in these transition times, or when slew rate detector 214 detects a relatively extreme acceleration on machine 100, the estimation of the bale weight may be less accurate. Therefore, in those cases, dynamic condition processing logic 212 can restart or reset or the measurement operation that is being used to measure or estimate the weight of module 110 so it takes place when no such dynamic conditions exist.

Transfer function application logic 222 illustratively applies a transfer function to the various sensed values that are received by bale weight processing logic 192 and generates a weight value for the module 110 being weighed, using the transfer function and the detected values. One example of a transfer function that can be used to estimate the weight of a module is described below with respect to Equation 1.

$$\text{Bale Weight} = \frac{(D_3(F_{RC} \cdot 2))/(D_2)}{\text{Cos(Roll)}} \quad \text{Eq. 1}$$

Where, $D_2 = (\text{Cos}((\theta+\propto)+G-180))\cdot(D_4-17.4+(0.1539BD)))+ (\text{Cos}(\theta+\propto))*D_1)$ And, $F_{RC}$=((Cylinder Base Pressure·Cylinder Base Area)– (Cylinder Rod Pressure·(Cylinder Base Area– Cylinder Rod Area)))–Empty Cal. Reaction Force The weight value can be provided to measurement array generator logic 220 where logic 220 is used to ultimately estimate the weight of module 110. Measurement array generator logic 220 can generate an array of module weight measurement results that are taken over time. Once the array is filled, subsequent measurement values can be taken and, if appropriate, they can be used to replace existing values in the array. The values in the array can be used to obtain the ultimate weight value for the module 110 being weighed. Basing the ultimate weight value on a plurality of values in the array may increase accuracy.

For instance, if a new value is greater than a current average of all the array elements, but less than a maximum value in the array, it may be used to replace the maximum value in the array. If the new value is less than the current average, but greater than the minimum value in the array, it may be used to replace the minimum value in the array. Measurement array generator logic 220 may continue this type of operation until the array average is within a given percent of the maximum and minimum values in the array, at which point the weighing process may be complete and the weight of module 110 may be estimated based upon the array values (such as the average of those values, the median of those values, or based in some other way on those values).

Calibration control system 206 illustratively controls handler 108 so that its weight can be estimated and thus accounted for in estimating the weight of the module 110, that it is supporting. It will be noted that the weight of handler 108 can change over time, and therefore, calibration control system 206 may control handler 108 to perform a calibration on it, intermittently, periodically, or otherwise in a repeated manner, to ensure that the weight being used for handler 108 is relatively accurate.

For instance, as machine 100 moves through the field, handler 108 can accumulate debris (such as mud or agricultural debris) which can significantly add to its weight. Thus, handler control signal generator 226 illustratively controls cylinder 122 to move handler 108 to a desired position. The desired position may be between, for instance, 15 and 20 degrees relative to the frame 112 (e.g., the angle theta is between 15 and 20 degrees). Calibration control system 206 may then illustratively control cylinder pressure generator logic 204 to perform a measurement cycle to measure the weight of the handler 108, itself, when it is not carrying a module 110 (e.g., when it is empty). This is described in greater detail below with respect to FIG. 5. The weight of handler 108 (e.g., the calibration value) can then be accounted for during subsequent measurements that are taken to estimate the weight of a module 110 when it is being carried by handler 108. Storage component 228 can illustratively store, and make available, the calibration value determined during the calibration process, so that it can be used by transfer function application logic 222 to perform weighing operations on round modules that are subsequently carried by handler 108.

Figure 5:
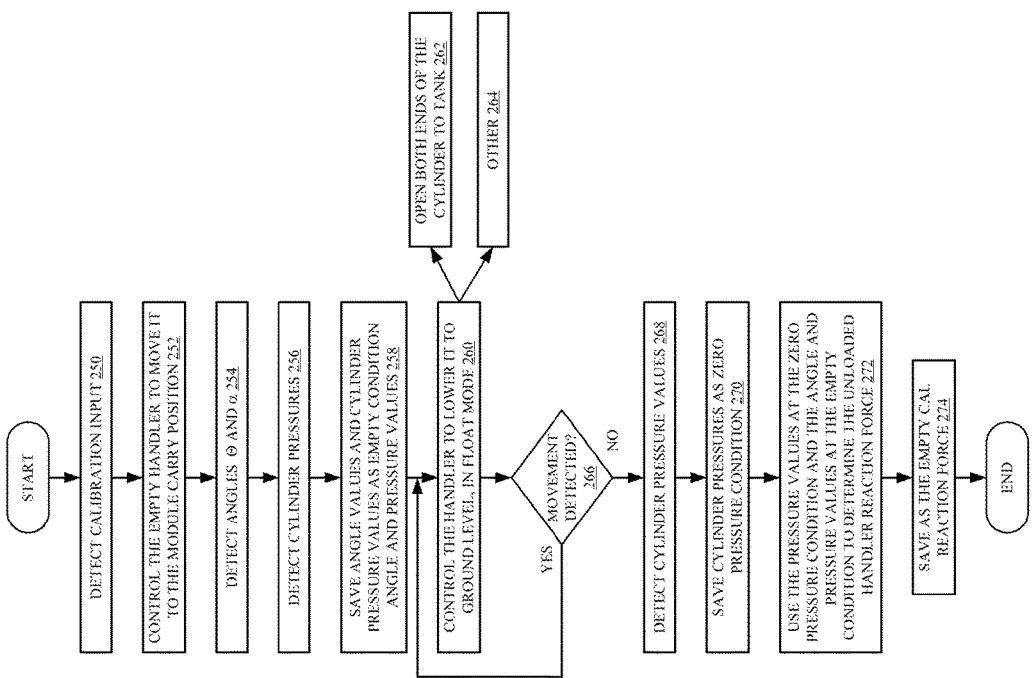
FIG. 5 is a flow diagram illustrating one example of the operation of the architecture shown in FIG. 3 in generating a calibration force.

FIG. 5 is a flow diagram illustrating one example of the operation of bale weight processing logic 192, and particularly of calibration control system 206, in performing a calibration operation to identify the weight (or reaction force on cylinder 122), that is due to the weight of handler 108, when no module 110 is present on it. FIGS. 2-5 will now be described in conjunction with one another. Calibration detector 225 first detects a calibration input indicating that it is time to perform a calibration operation to identify or estimate a reactive force on cylinder 122 due to the weight of handler 108, when it is empty. Detecting the calibration input is indicated by block 250 in the flow diagram of FIG. 5. As discussed above, this may be based upon a time period, based upon a distance traveled by machine 100 since a last calibration was performed, based upon a user input explicitly starting the calibration process or based upon a wide variety of other inputs or sensed variables.

Handler control signal generator 226 then generates a control signal and provides it to module handler functionality 166 (shown in FIG. 3) to move the handler to the module carrying position. This is indicated by block 252. In one example, the module carrying position is defined as a range of angles of the handler 108 relative to the frame 112 (e.g., a range of angle values for the angle theta). The angle value for the angle theta (e.g., the position of the handler 108 relative to frame 112) and for the angle alpha (e.g., the pitch angle of vehicle 100) are then detected and stored. This is indicated by block 254. System 206 then controls measuring logic 210 to detect the differential pressure across cylinder 122, using pressure sensors 125 and 127. Detecting these cylinder pressures is indicated by block 256 in the flow diagram of FIG. 5. The angle values and the cylinder pressure values are then saved as angle and pressure values corresponding to an empty condition. This is indicated by block 258.

Handler control signal generator 226 then controls handler 108 to move it to ground level, and to place cylinder 122 in the float mode. This is indicated by block 260. In one example, it controls cylinder 122 to enter the float mode by opening both ends of the cylinder to tank. This is indicated by block 262. It can control the handler in other ways as well, as indicated by block 264. As long as the handler 108 is still moving (e.g., as long as it is still moving toward ground level) processing reverts to block 260. This is indicated by block 266. However, once the handler 108 is no longer moving, that means that it has reached ground level and the cylinder 122 is placed in float mode. Calibration control system 206 again controls measuring logic 210 to measure the cylinder pressure values (e.g., the differential cylinder pressure) using pressure sensors 125 and 127. This is indicated by block 268 in FIG. 5. These pressure values are then saved as the zero pressure condition values, as indicated by block 270. By way of example, it may be that there is still differential pressure across cylinder 122, even when it is at ground level and both ends are open to tank. This residual differential pressure is saved as the zero pressure condition value.

Calibration control system 206 then controls transfer function application logic 222 to apply the transfer function using the pressure values corresponding to the zero pressure condition and the angle and pressure values corresponding to the empty condition to determine the unloaded handler reaction force ($F_{RC}$) on cylinder 122 (shown in FIG. 2). This is indicated by block 272. This reaction force is then saved as the empty calibration reaction force. It can be saved in data store 196, by storage component 228, or at another location where it can be accessed by transfer function application logic 222 when logic 222 is estimating the weight of a round module that is on handler 108. Saving the empty calibration reaction force is indicated by block 274 in FIG. 5.

Having performed this calibration, the reaction force on cylinder 122 due to the weight of the empty handler 108 has now been estimated, and can be subtracted from the reaction force generated on cylinder 122 when handler 108 is carrying a module 110. As mentioned above, this calibration can be repeated to account for changes in the weight of handler 108 (such as when it accumulates debris or otherwise changes in weight).

Figure 6:
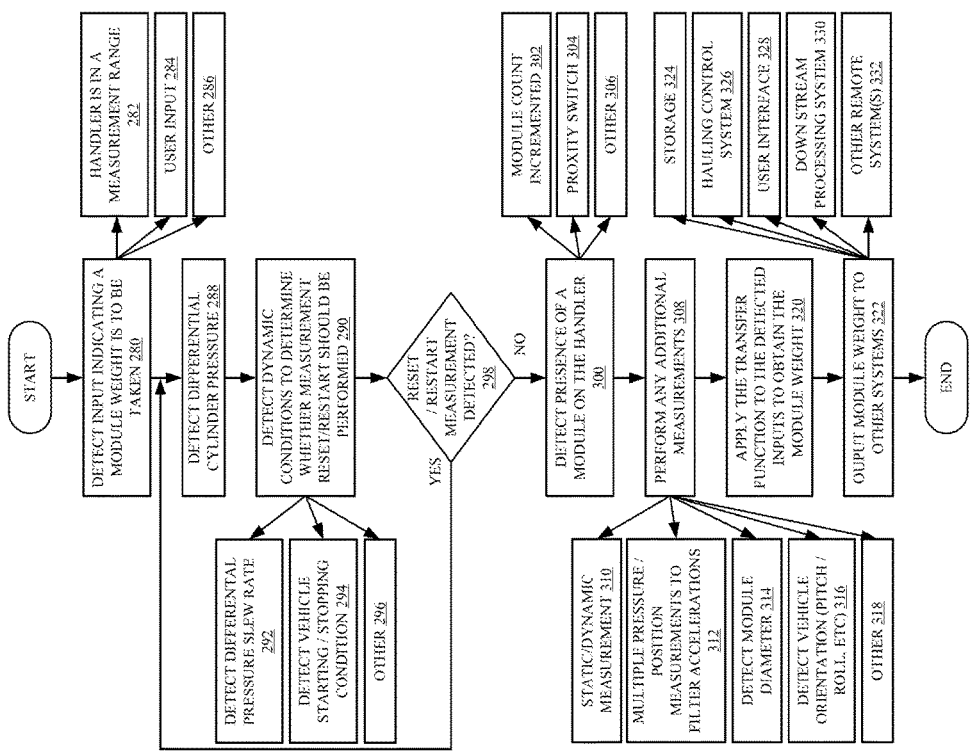
FIG. 6 is a flow diagram illustrating one example of the operation of the architecture illustrated in FIG. 3 in generating a round module weight value.

Bale weight processing logic 192 is now ready to estimate the weight of a module 110 that resides on handler 108. FIG. 6 is a flow diagram illustrating one example of the operation of logic 192 in estimating the weight of a module 110 on handler 108. FIGS. 2-4 and 6 will now be described in conjunction with one another.

Measurement cycle detector 209 first detects an input indicating that a module weight is to be generated. This is indicated by block 280 in the flow diagram of FIG. 6. For instance, it may be that it detects that handler 108 is in a measurement range (e.g., the angle theta is in a range where a module measurement can be taken such as, by way of example only, 15-20 degrees). This is indicated by block 282. It may be that it has detected a user input by operator 154 indicating that a measurement should be taken. This is indicated by block 284. It may detect this in other ways, such as when baling and wrapping system 106 indicates that it has wrapped a bale and moved it onto handler 108, or in other ways. This is indicated by block 286.

Measuring logic 210 then detects the differential pressure across cylinder 122, using pressure sensors 125 and 127. Detecting the differential cylinder pressure is indicated by block 288 in FIG. 6.

Dynamic condition processing logic 212 then detects dynamic conditions of machine 100 to determine whether the measurement operation should be reset or restarted in view of those dynamic conditions. This is indicated by block 290 in the flow diagram of FIG. 6. By way of example, slew rate detector 214 may detect a slew rate in the differential pressure value. The slew rate may be indicative of a rate of change of the differential pressure value. If it is changing relatively quickly, this may indicate an unusual or relatively extreme acceleration that is being imparted to handler 108 (such as when machine 100 goes over a bump, etc.). Detecting the differential pressure slew rate is indicated by block 292.

Starting/stopping detector 216 can also detect whether machine 100 is within a range of a zero speed condition so that the measurement should be delayed, reset or restarted. For instance, as discussed above, it can receive a signal from speed sensor 186 indicating that mobile machine 100 is decelerating and about to stop, has just stopped, or has just started and is accelerating, etc. Detecting the vehicle starting/stopping condition is indicated by block 294. Dynamic condition processing logic 212 can detect a wide variety of other dynamic conditions that indicate that the measuring process should be delayed, restarted or reset as well, and this is indicated by block 296.

If it is determined that the measurement process should be delayed, restarted or reset, then processing reverts to block 288 where the differential pressure is again detected and block 290 where the dynamic conditions are processed again. This is indicated by block 298. However, if, at block 298, it is determined that none of the dynamic conditions exist and the measurement process may proceed, then cylinder pressure generator logic 204 determines whether a module 110 is present on handler 108, or whether handler 108 is empty. This is indicated by block 300. The presence of a module can be detected in a wide variety of ways. For instance, the baling and wrapping system 106 may have a module counter that increments when a module has been baled and wrapped and transferred to handler 108. Detecting module presence on handler 108 based on the module count being incremented is indicated by block 302. Handler 108 (or another portion of machine 100) may also have a proximity switch which is activated when a module is positioned on handler 108. Detecting module presence on handler 108 based on the activation of a proximity switch is indicated by block 304. Module presence on handler 108 can be detected in a wide variety of other ways as well, and this is indicated by block 306.

Bale weight processing logic 192 then performs any other additional measurements that are used by transfer function application logic 222 in order to generate a weight value indicative of an estimated or measured weight for the module being weighed. Performing the additional measurements is indicated by block 308.

For example, some additional measurements may be taken if the weight is being determined while handler 108 is in a fixed position or while it is moving (e.g., whether it is a static or dynamic measurement). This is indicated by block 310. If handler 108 is in the measurement position (e.g., where the angle theta is in a range of 15-20 degrees), and handler 108 is not moving, this may be a static measurement. However, where handler 108 is within the measurement range (the range of angles for theta that comprise the measurement position) but is still moving within that range (such as when handler 108 is still moving to the transport position), then the measurement is a dynamic measurement. In one example, a dynamic measurement for a module may be taken first. However, if a static measurement for the same module is subsequently taken, then the static measurement is used instead of the dynamic measurement. However, if no static measurement is completed, then the dynamic measurement can be used for that module.

In addition, and as discussed above with respect to FIG. 4, measurement array generator logic 220 may generate multiple pressure and position measurements and add them to an array of measurements in order to filter undesired accelerations from the estimated weight value. Performing multiple measurements is indicated by block 312.

Transfer function application logic 222 also illustratively receives the module diameter value provided by module diameter sensor 188. Detecting the module diameter is indicated by block 314. It also illustratively detects the pitch and roll angles of vehicle 100, and possibly other vehicle position or orientation measurements as well. This is indicated by block 316. Any other additional measurements may be taken, and this is indicated by block 318.

Transfer function application logic 222 then applies a transfer function to the detected inputs to obtain a measured or estimated module weight for the module 110 on handler 108. This is indicated by block 320. The transfer function will depend on the particular configuration and physical dimensions of various portions of handler 108, and machine 100. For instance, the dimensions, measured angles, calculated or measured reaction forces, etc., may be used in different ways to obtain the measured or estimated weight of the module 110, because of different geometries. However, in one example, the transfer function is illustrated by Equation 1 above.

Control signal generator 198 can then generate a control signal based upon the measured or estimated weight. It can also output a signal indicative of the measured or estimated weight as well. Outputting module weight is indicated by block 322. It can be stored on a local or remote storage system as indicated by block 324. It can be output to a hauling control system that can control the operations of hauling vehicles. For instance, in some cases, where a hauling vehicle has an estimated or measured weight of the modules it is hauling, it need not perform a separate measurement process before dropping those modules at a cotton gin or a storage facility or elsewhere. Outputting the weight to a hauling control system is indicated by block 326.

It can be output to user interfaces 154 for being displayed or otherwise surfaced to operator 154. This is indicated by block 328. It can be output to any downstream processing systems as indicated by block 330. This may include, for instance, a cotton gin, which is attempting to schedule the arrival and processing of various cotton modules. It can be output to other remote systems 158 as well, and this is indicated by block 332 in the flow diagram of FIG. 6.

It can thus be seen that the present discussion provides for generating a module weight value for a module even during movement of the harvester (such as movement of a cotton harvester through a field carrying a module). It also illustratively generates the measurement by sensing differential pressure across one or more cylinders that support the handler 108 on which the module is positioned. By sensing the differential pressure, any residual pressure or tank pressure in the cylinder is accounted for and this increases the accuracy of the computing system in generating the measurement value. Similarly, the present system accounts for the weight of the handler 108, itself. It also accounts for changes in that weight due to such things as accumulation of debris or for other reasons. This can be done by repeating the calibration process discussed above, and this also greatly enhances the accuracy of the system in generating a measurement value for the weight of the module.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
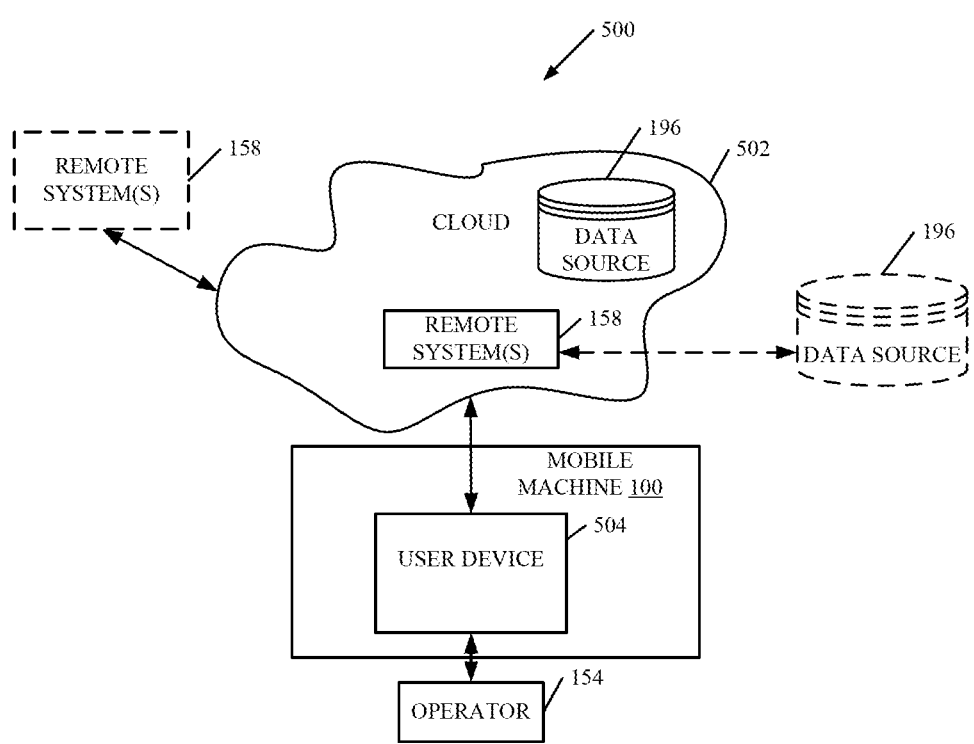
FIG. 7 is a block diagram of one example of the architecture illustrated in FIG. 3, deployed in a remote server architecture.

FIG. 7 is a block diagram of mobile machine (e.g., harvester 100), shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 3 and they are similarly numbered. FIG. 7 specifically shows that remote systems 158 and 118 and data store 196 can be located at a remote server location 502. Therefore, harvester 100 accesses those systems through remote server location 502.

FIG. 7 also depicts another example of a remote server architecture. FIG. 7 shows that it is also contemplated that some elements of FIG. 3 can be disposed at remote server location 502 while others are not. By way of example, data store 196 or remote systems 158 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
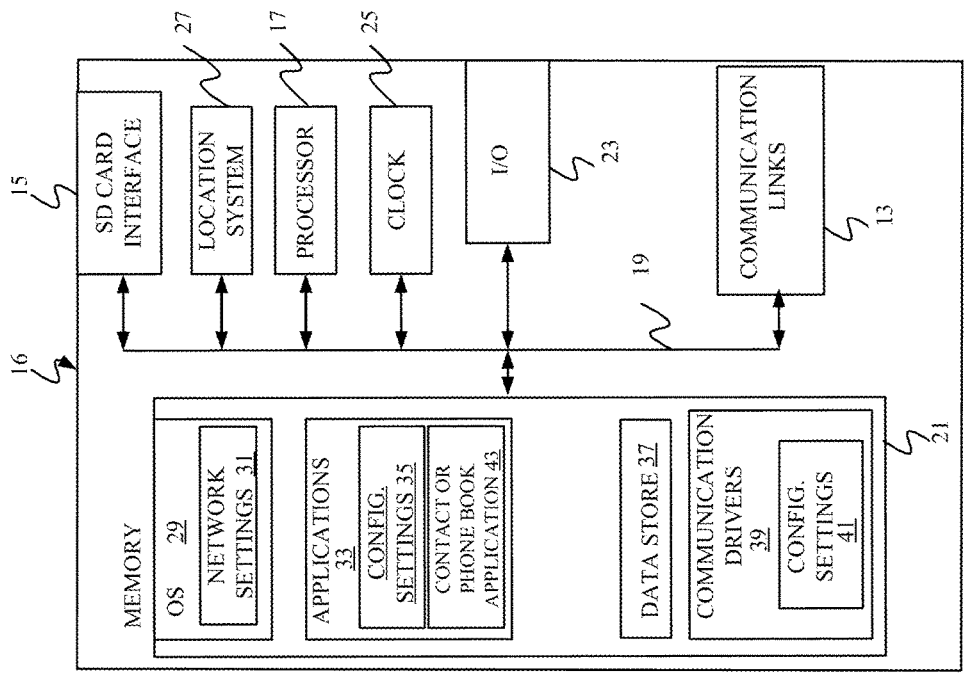
FIGS. 8-10 show examples of user devices that can be used in the architectures shown in previous FIGs.
Figure 9:
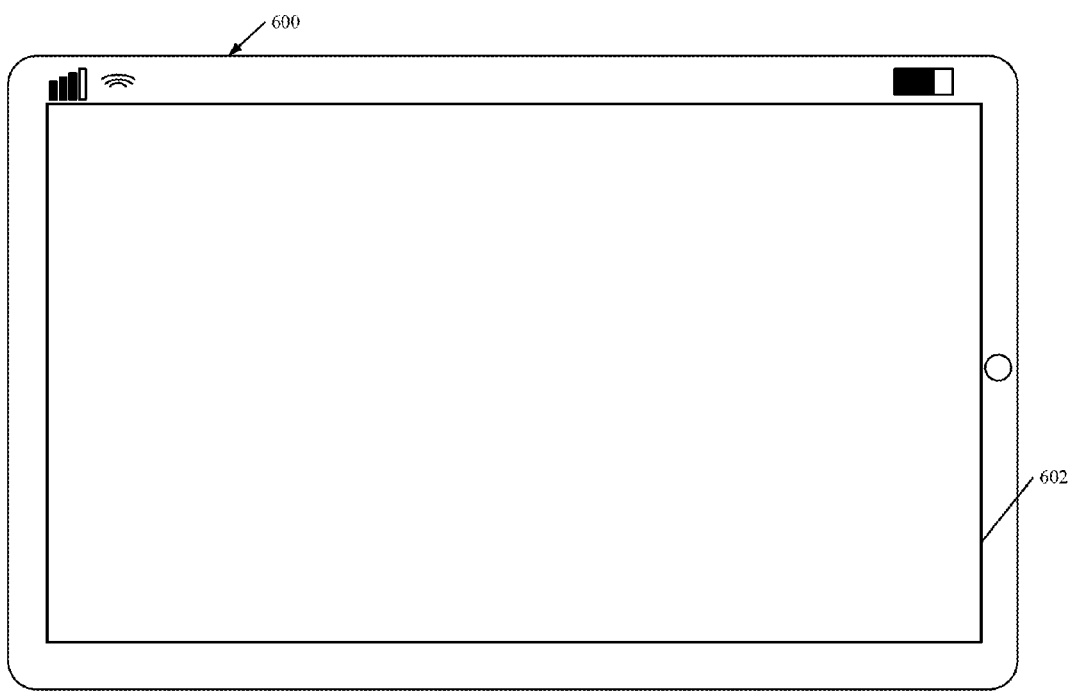
Figure 10:
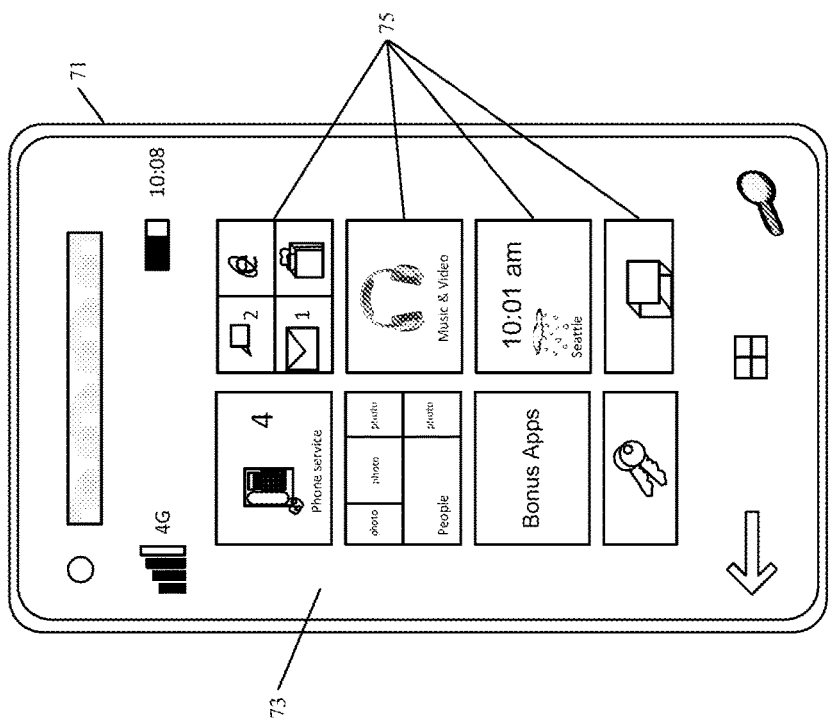

FIG. 8 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the module weights. FIGS. 9-10 are examples of handheld or mobile devices.

FIG. 8 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers 194 from FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
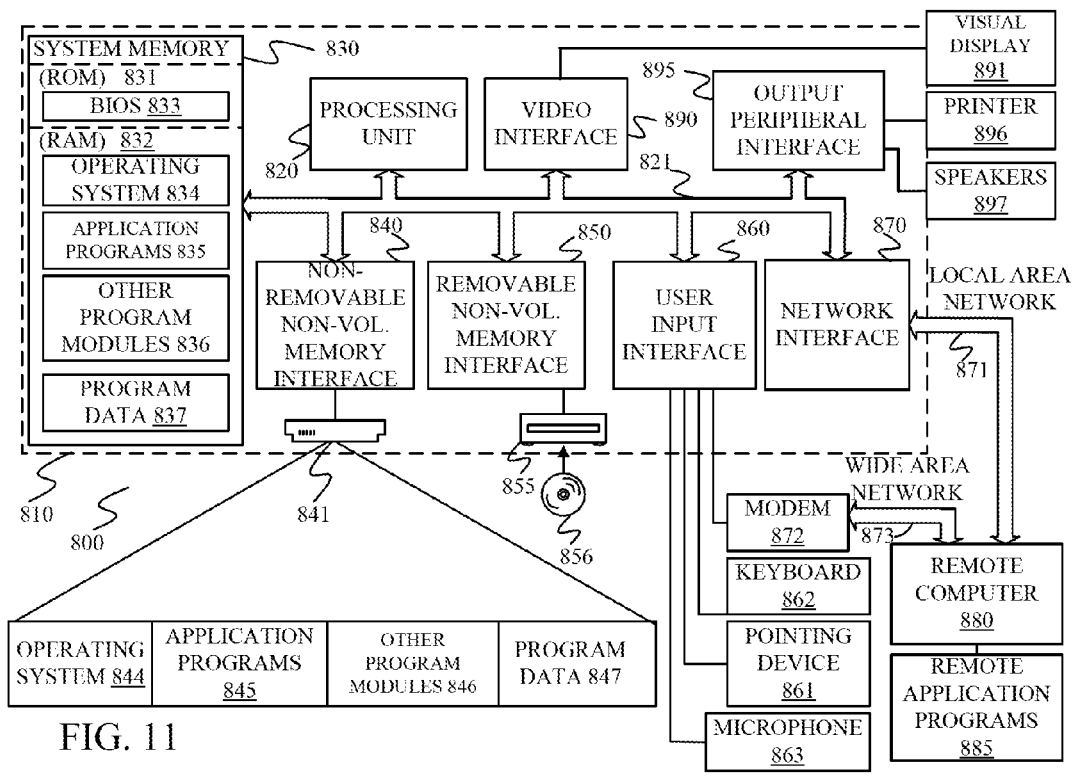
FIG. 11 is a block diagram of one example of a computing environment that can be used in the architectures shown in the previous figures.

FIG. 11 is one embodiment of a computing environment in which elements of FIG. 3, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processors or servers 194), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It should also be noted that the different embodiments described herein can be combined in different ways. That is, parts of one or more embodiments can be combined with parts of one or more other embodiments. All of this is contemplated herein.

Example 1 is a mobile baling machine, comprising:
a baling system that generates a module of harvested material;
a handler coupled to the baling system to receive the module, the handler being pivotable relative to a frame of the mobile baling machine;
a cylinder having a base end and a rod end, coupled to the handler to drive pivotal movement of the handler relative to the frame to move the handler to a transport position for transporting the module during travel of the mobile baling machine;
a set of cylinder sensors that sense a differential pressure across the cylinder when the module is on the handler; and
bale weight processing logic that generates a bale weight value based on a position of the handler and based on the differential pressure sensed across the cylinder.

Example 2 is the mobile baling machine of any or all previous examples and further comprising:
a bale diameter sensor that senses a size value indicative of a diameter of the module, the bale weight processing logic generating the bale weight value based on the diameter of the module.

Example 3 is the mobile baling machine of any or all previous examples wherein the bale weight processing logic comprises:
a calibration control system that intermittently updates a handler weight value indicative of a weight of the handler being acted on by the cylinder, the bale weight processing logic generating the bale weight value based on the intermittently updated handler weight value.

Example 4 is the mobile baling machine of any or all previous examples and further comprising:
dynamic condition processing logic that identifies a dynamic condition and, in response, delays the bale weight processing logic in generating the bale weight value until the dynamic condition is no longer identified.

Example 5 is the mobile baling machine of any or all previous examples wherein the dynamic condition processing logic comprises:
a slew rate detector that detects a rate of change of the differential pressure to identify the dynamic condition.

Example 6 is the mobile baling machine of any or all previous examples wherein the dynamic condition processing logic comprises:
a starting/stopping detector that detects the dynamic condition as a transition of the mobile baling machine to a stopped condition from a traveling condition or to a traveling condition from a stopped condition.

Example 7 is the mobile baling machine of any or all previous examples wherein the cylinder pressure generator logic comprises:
measurement array generator logic that generates an array of bale weight values, the bale weight processing logic generating the bale weight value based on the bale weight values in the array of bale weight values.

Example 8 is the mobile baling machine of any or all previous examples wherein the bale weight processing logic further comprises:
transfer function application logic that applies a transfer function to the differential pressure sensed across the cylinder and the position of the handler to obtain the bale weight value.

Example 9 is the mobile baling machine of any or all previous examples wherein the set of cylinder sensors comprises:
a base end pressure sensor that senses cylinder pressure at the base end of the cylinder; and
a rod end pressure sensor that senses cylinder pressure at the rod end of the cylinder.

Example 10 is the mobile baling machine of any or all previous examples and further comprising:
a measurement cycle detector that detects when the position of the handler is in a measurement position, the bale weight processing logic generating the bale weight value in response to the handler being in the measurement position.

Example 11 is a method, comprising:
receiving a module of agricultural material, from a baling system of a mobile baling machine, on a handler coupled to the baling system, the handler being movable relative to a frame of the mobile baling machine;
controlling an actuator, having an inlet end and an outlet end, to drive movement of the handler relative to the frame to move the handler to a transport position for transporting the module during travel of the mobile baling machine;
sensing a position of the handler relative to the frame;

sensing a differential pressure across the inlet and outlet
ends of the actuator when the module is on the handler;
and
generating a bale weight value based on the position of the
handler and based on the differential pressure.

Example 12 is the method of any or all previous examples
wherein generating the bale weight value comprises:
sensing a size characteristic indicative of a diameter of the
module; and
generating the bale weight value based on the diameter of
the module.

Example 13 is the method of any or all previous examples
and further comprising:
intermittently updating a handler weight value indicative
of a weight of the handler being acted on by the
actuator, wherein generating the bale weight value
comprises generating the bale weight value based on
the intermittently updated handler weight value.

Example 14 is the method of any or all previous examples
and further comprising:
identifying a dynamic condition; and,
in response, delaying generation of the bale weight value
until the dynamic condition is no longer identified.

Example 15 is the method of any or all previous examples
wherein identifying the dynamic condition comprises at
least one of:
detecting a rate of change of the differential pressure; or
detecting the dynamic condition as a transition of the
mobile baling machine to a stopped condition from a
traveling condition or to a traveling condition from a
stopped condition.

Example 16 is the method of any or all previous examples
wherein generating the bale weight value comprises:
generating an array of bale weight values; and
generating the bale weight value based on the bale weight
values in the array of bale weight values.

Example 17 is the method of any or all previous examples
wherein generating the bale weight value comprises:
applying a transfer function to the differential pressure
sensed across the actuator and the position of the
handler to obtain the bale weight value.

Example 18 is the method of any or all previous examples
wherein the actuator comprises a cylinder with a base end
and a rod end and wherein sensing the differential pressure
comprises:
sensing cylinder pressure at the base end of the cylinder;
and
sensing cylinder pressure at the rod end of the cylinder.

Example 19 is a cotton harvester, comprising:
a baling system that generates a cotton module;
a handler coupled to the baling system to receive the
cotton module, the handler being movable relative to a
frame of the cotton harvester;
a cylinder having a base end and a rod end, coupled to the
handler to drive movement of the handler relative to the
frame to move the handler to a transport position for
transporting the cotton module during travel of the
cotton harvester;
a bale diameter sensor that senses a size value indicative
of a diameter of the cotton module;
a set of cylinder sensors that sense a differential pressure
across the cylinder when the cotton module is on the
handler; and
bale weight processing logic that generates a bale weight
value based on a position of the handler, the sensed size
value and the differential pressure sensed across the
cylinder.

Example 20 is the cotton harvester of any or all previous
examples and further comprising:
a calibration control system that intermittently updates a
handler weight value indicative of a weight of the
handler being acted on by the cylinder, the bale weight
processing logic generating the bale weight value based
on the intermittently updated handler weight value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile baling machine, comprising:
a baling system that generates a module of harvested
material;
a handler coupled to the baling system to receive the
module, the handler being pivotable relative to a frame
of the mobile baling machine;
a cylinder having a base end and a rod end, coupled to the
handler to drive pivotal movement of the handler
relative to the frame to move the handler to a transport
position for transporting the module during travel of the
mobile baling machine;
a set of cylinder sensors that sense a differential pressure
across the cylinder when the module is on the handler;
and
bale weight processing logic, executable on a computer
processor, that generates a bale weight value based on
a position of the handler and based on the differential
pressure sensed across the cylinder.

2. The mobile baling machine of claim 1 and further comprising:
a hale diameter sensor that senses a size value indicative
of a diameter of the module, the bale weight processing
logic generating the bale weight value based on the
diameter of the module.

3. The mobile haling machine of claim 2 wherein the bale weight processing logic comprises:
a calibration control system that intermittently updates a
handler weight value indicative of a weight of the
handler being acted on by the cylinder, the bale weight
processing logic generating the hale weight value based
on the intermittently updated handler weight value.

4. The mobile baling machine of claim 3 and further comprising:
dynamic condition processing logic, executable on the
processor, that identifies a dynamic condition and, in
response, delays the hale weight processing logic in
generating the bale weight value until the dynamic
condition is no longer identified.

5. The mobile baling machine of claim 4 wherein the dynamic condition processing logic comprises:
a slew rate detector that detects a rate of change of the
differential pressure to identify the dynamic condition.

6. The mobile baling machine of claim 4 wherein the dynamic condition processing logic comprises:
a starting/stopping detector that detects the dynamic condition as a transition of the mobile baling machine to a
stopped condition from a traveling condition or to a
traveling condition from a stopped condition.

7. The mobile baling machine of claim 1 wherein the cylinder pressure generator logic comprises:
measurement array generator logic, executable on the
processor, that generates an array of bale weight values, the bale weight processing logic generating the bale weight value based on the bale weight values in the array of bale weight values.

8. The mobile baling machine of claim 1 wherein the bale eight processing logic further comprises:
    transfer function application logic, executable on the processor, that applies a transfer function to the differential pressure sensed across the cylinder and the position of the handler to obtain the bale weight value.

9. The mobile baling machine of claim 1 wherein the set of cylinder sensors comprises:
    a base end pressure sensor that senses cylinder pressure at the base end of the cylinder; and
    a rod end pressure sensor that senses cylinder pressure at e rod end of the cylinder.

10. The mobile baling machine of claim 1 and further comprising:
    a measurement cycle detector that detects when the position of the handler is in a measurement position, the bale weight processing logic generating the bale weight value in response to the handler being in the measurement position.

11. A method, comprising:
    receiving a module of agricultural material, from a baling system of a mobile baling machine, on a handler coupled to the baling system, the handler being movable relative to a frame of the mobile baling machine;
    controlling an actuator, having an inlet end and an outlet end, to drive movement of the handler relative to the frame to move the handler to a transport position for transporting the module during travel of the mobile baling machine;
    sensing a position of the handler relative to the frame;
    sensing a differential pressure across the inlet and outlet ends of the actuator when the module is on the handler; and
    generating a hale weight value based on the position of the handler and based on the differential pressure.

12. The method of claim 11 wherein generating the bale weight value comprises:
    sensing a size characteristic indicative of a diameter of the module; and
    generating the bale weight value based on the diameter of the module.

13. The method of claim 12 and further comprising:
    intermittently updating a handler weight value indicative of a weight of the handler being acted on by the actuator, wherein generating the hale weight value comprises generating the bale weight value based on the intermittently updated handler weight value.

14. The method of claim 13 and further comprising:
    identifying a dynamic condition; and,
    in response, delaying generation of the bale weight value until the dynamic condition is no longer identified.

15. The method of claim 14 wherein identifying the dynamic condition comprises at least one of:
    detecting a rate of change of the differential pressure; or
    detecting the dynamic condition as a transition of the mobile baling machine to a stopped condition from a traveling condition or to a traveling condition from a stopped condition.

16. The method of claim 11 wherein generating the bale weight value comprises:
    generating an array of bale weight values; and
    generating the bale weight value based on the bale weight values in the array of bale weight values.

17. The method of claim 11 wherein generating the bale weight value comprises:
    applying a transfer function to the differential pressure sensed across the actuator and the position of the handler to obtain the bale weight value.

18. The method of claim 11 wherein the actuator comprises a cylinder with a base end and a rod end and wherein sensing the differential pressure comprises:
    sensing cylinder pressure at the base end of the cylinder; and
    sensing cylinder pressure at the rod end of the cylinder.

19. A cotton harvester, comprising:
    a haling system that generates a cotton module;
    a handler coupled to the haling system to receive the cotton module, the handler being movable relative to a frame of the cotton harvester;
    a cylinder having a base end and a rod end, coupled to the handler to drive movement of the handler relative to the frame to move the handler to a transport position for transporting the cotton module during travel of the cotton harvester;
    a bale diameter sensor that senses a size value indicative of a diameter of the cotton module;
    a set of cylinder sensors that sense a differential pressure across the cylinder when the cotton module is on the handler; and
    bale weight processing logic, executable on a computer processor, that generates a bale weight value based on a position of the handler, the sensed size value and the differential pressure sensed across the cylinder.

20. The cotton harvester of claim 19 and further comprising:
    a calibration control system that intermittently updates a handler weight value indicative of a weight of the handler being acted on by the cylinder, the bale weight processing logic generating the bale weight value based on the intermittently updated handler weight value.

* * * * *